United States Patent [19]
Wing

[11] 4,111,568
[45] Sep. 5, 1978

[54] UNITARY LOCKABLE TURNBUCKLE

[75] Inventor: George S. Wing, Palos Verdes Estates, Calif.

[73] Assignee: Hi-Shear Corporation, Torrance, Calif.

[21] Appl. No.: 816,802

[22] Filed: Jul. 18, 1977

[51] Int. Cl.$^2$ .............................. F16D 9/00
[52] U.S. Cl. .......................... 403/2; 403/44; 403/46; 151/15; 85/62
[58] Field of Search .................. 403/2, 43, 44, 45, 46, 403/47, 48, 343, 300, 306, 308; 85/62; 151/15; 29/175 R, 418

[56] References Cited

U.S. PATENT DOCUMENTS

| | | | |
|---|---|---|---|
| 1,374,963 | 4/1921 | Stevenson | 151/15 UX |
| 1,380,395 | 6/1921 | Korach | 151/15 X |
| 1,457,749 | 6/1923 | Rast | 151/15 X |
| 2,696,397 | 12/1954 | Booth | 403/46 |
| 2,818,280 | 12/1957 | Budnik | 85/62 X |
| 3,306,154 | 2/1967 | Bailey | 85/62 |
| 3,383,974 | 5/1968 | Dahl | 85/62 |
| 3,498,652 | 3/1970 | Cass | 403/43 |
| 3,801,207 | 4/1974 | Herbenar | 403/46 |

*Primary Examiner*—Wayne L. Shedd
*Attorney, Agent, or Firm*—Donald D. Mon

[57] ABSTRACT

A unitary lockable turnbuckle constructed from an elongated member, which is partially slit at two axially spaced-apart locations so as to form an interconnected barrel with a nut at each end. A thread is formed in each nut and the adjacent portion of the barrel, the thread at one end being of opposite hand from the thread at the other end. The slits leave reduced shear sections which break when the nuts are sufficiently torqued in opposition to the barrel. Preferably the width of the slit is reduced substantially to zero before the thread is formed.

23 Claims, 13 Drawing Figures

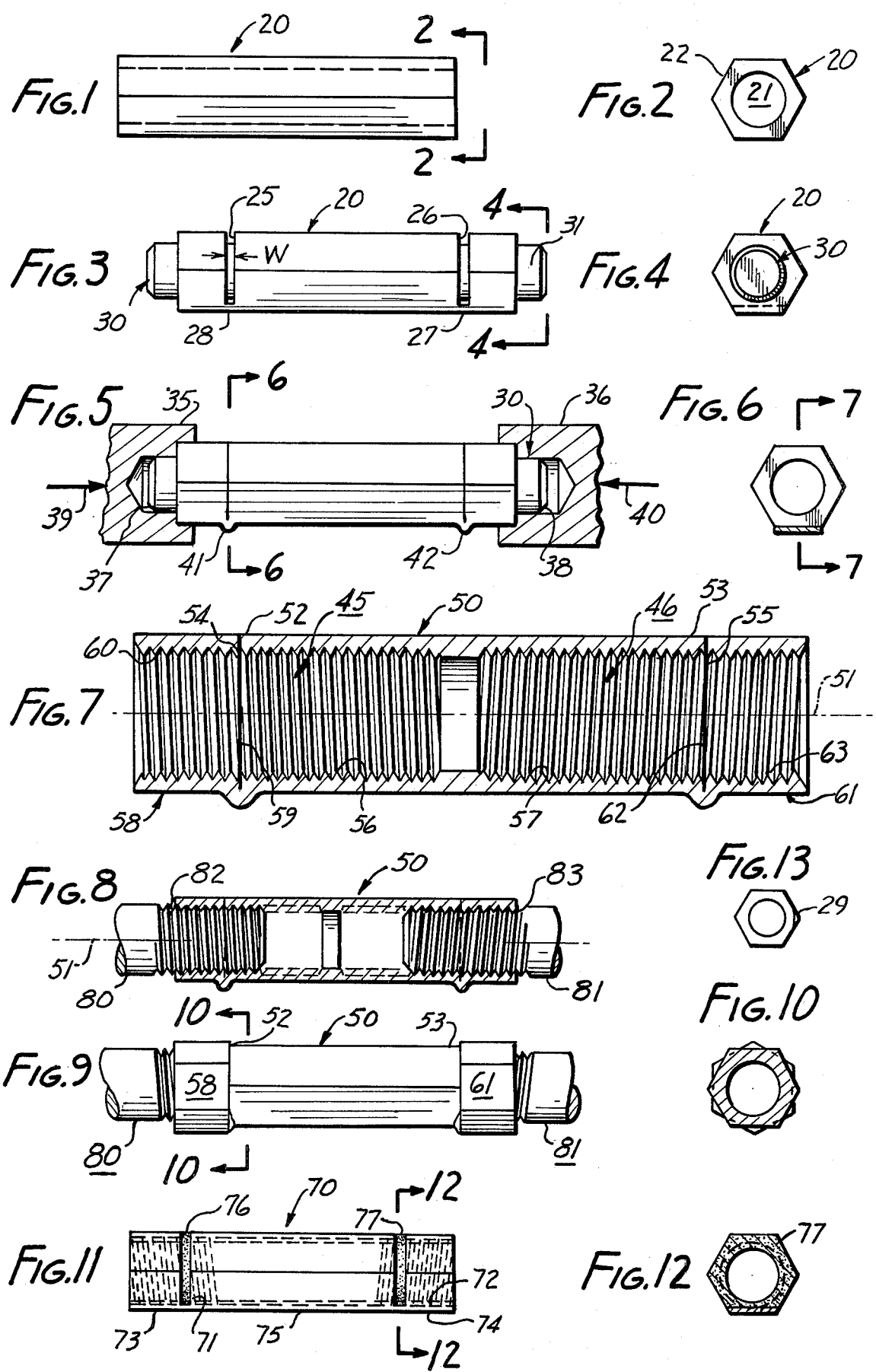

UNITARY LOCKABLE TURNBUCKLE

This invention relates to a unitary lockable turnbuckle. The turnbuckle is a highly developed and extensively used device to adjust the relative position of two parts. For example, in automobile steering mechanisms a turnbuckle barrel is turned to adjust the spacing-apart of two rods. Then the turnbuckle is locked in placed. The locking means usually comprises clamps or the like, and existing turnbuckle constructions are espensive and relatively complicated. Often the barrel is an axially split tube which can loosen or buckle, much to the danger of a person who relies on it.

It is an object of this invention to provide a turnbuckle which can be inexpensively manufactured, which is elegant in utilizing an absolute minimum number of parts, and which by its physical condition indicates that it has been adjusted to a desired setting and locked in place. Its barrel can be made solid to resist buckling.

A unitary lockable turnbuckle according to this invention comprises a barrel having a central axis, a first and a second nut, one at each end of the barrel, and a first and a second shear section integral with and interconnecting the barrel with the first and second nuts, respectively. A first and a second thread are formed in the respective first and second nuts and in a bore in the barrel. The shear sections can be sheared by exertion of sufficient torque between the respective nut and the barrel.

According to a preferred method of manufacturing this device, a rod-like member is slit to form the nuts and the first and second shear sections, the width of the slit is reduced substantially to zero by axial compression, and the threads are tapped through the nut and into a bore in the barrel, in phase from nut to barrel and opposite in hand at each end.

The above and other features of this invention will be fully understood from the following detailed description and the accompanying drawings, in which:

FIG. 1 is a side elevation of a rod-like member used to manufacture the presently-preferred embodiment of the invention;

FIG. 2 is a right-hand end view taken at line 2—2 in FIG. 1;

FIG. 3 shows an intermediate step in the maufacture of the invention;

FIG. 4 is a right-hand end view taken at line 4—4 in FIG. 3;

FIG. 5 is a side elevation, partly in cutaway cross-section, showing an additional step in the manufacture of the invention;

FIG. 6 is a cross-section taken at line 6—6 in FIG. 5;

FIG. 7 is an axial cross-section taken at line 7—7 in FIG. 6;

FIG. 8 shows the turnbuckle of FIG. 7 ready for adjustment;

FIG. 9 shows the turnbuckle of FIG. 7 adjusted and locked;

FIG. 10 is a cross-section taken at line 10—10 of FIG. 9;

FIG. 11 is a side view of another embodiment of the invention;

FIG. 12 is a cross-section taken at line 12—12 in FIG. 11 and

FIG. 13 is a fragmentary cross-section similar to FIG. 6 showing another arrangement for the shear sections.

In FIG. 1 a rod-like member 20 is shown which has a central passage 21 extending therethrough. It has a prismatic hexagonal array outside surfaces 22 extending from end to end thereof. The material for the member will be selected for suitable strength. Often it will be a mild carbon steel.

FIG. 3 shows an intermediate step in making a device according to the invention. A pair of slits 25, 26 has been cut fully across the central passage 21 and leave intact webs comprising first shear section 27 and a second shear section 28 at the bottom of the slits. Shear sections 27 and 28 are shown in FIG. 4 extending parallel to one of the sidewalls. In FIG. 13 a shear section 43 is shown at a corner of the hexagon, the slit having been cut normal to one of the sides. Either type can be used.

A mandrel 30 having an outer wall 31 that makes a close fit with the inner wall of central passage 21 is placed in the central passage with its ends projecting beyond both ends of the rod-like member. As a next step, jaws 35, 36 are placed around the mandrel at each end, bearing against the first and second ends 37, 38, respectively, of the rod-like member without bottoming on the mandrel. Then the jaws are axially pressed toward one another by forces indicated by arrows 39, 40. This reduces the width "W" of the slits. The axial compression of the rod-like member squeezes the material forming the shear sections outwardly to form protrusions 41, 42 whose cross-sectional area is roughly rectangular in FIG. 6 or triangular in FIG. 13. The area of the cross-section and its distance from the central axis, and the shear strength of the material establish the torque which must be exerted in order to break the shear section. Of course the width of the slit will not usually be reduced completely to zero because of possible springback in the material but it will be reduced very close to zero and ordinarily its width will be only a fraction of a thousandth of an inch. Such a small spacing, or contiguity, of the faces is sometimes referred to as "closely adjacent." It can be reduced to zero if the compression is made while the material is soft. Later the material could be heat-treated to increase its strength.

Then the mandrel is next removed, and a first thread 45 of one hand is tapped from first end 37 and a second thread 46 is tapped from second end 38.

FIG. 7 shows that the foregoing processes have created a unitarily lockable turnbuckle which comprises a central barrel 50 extending along a central axis 51. The barrel has a first end 52 and a second end 53. There is a first face 54 on the first end and a second face 55 on the second end. A first axial bore 56 enters the first end through the first end face, and a second axial bore 57 enters the second end through the second end face. These faces extend laterally relative to central axis. They are preferably planar and normal to the axis, and sűrround the end of their respective bores, because the slit was cut entirely across the respective bores. It will be recognized that instead of a central passage extending all the way through as a consequence of tapping into a passage that extends from end to end of the rod-like member, there might have been left a central solid portion between the two separately-drilled bores. However, most expedient and least expensive construction will generally be arranged by starting with a rod-like member which is prismatically tubular for its entire length.

The slit has also formed a first nut 58 having a central axis coaxial with axis 51, a first bearing face 59 and a passage 60 entering the first nut through the first bearing face.

There is also a second nut 61 having a second bearing face 62 and a passage 63 entering the first nut through the second bearing face. The shear sections interconnect the nuts and the barrel and the respective first faces and second faces face toward one another. In the preferred embodiment of FIG. 7, they are closely adjacaent to one another, as contiguous as possible. A first thread 45 is in phase in the first nut and in the first axial bore. The second thread 46 is in phase in the passage of the second nut and in the second axial bore. The first and second threads are of opposite hands from one another.

FIGS. 11 and 12 show another embodiment of the invention wherein a rod-like member 70 which has been formed to the construction of FIG. 3 has at that time its first and second threads 71 and 72 formed across the first and second nuts 73, 74 to the central barrel 75 just as in the embodiment of FIG. 7. There is the difference that the slit has not been closed as in the step illustrated in FIG. 5, but instead a washer 76 is fitted into the slit with the respective first faces bearing against washer 76 and the respective second faces bearing against washer 77. The washer is apertured to pass an object threaded into the turnbuckle barrel. This is somewhat more complicated than the embodiment of FIG. 7 but it is still a useful embodiment.

In use, the turnbuckle is threaded to end members 80, 81 which bear respective threads 82, 83 of opposite hands which match threads 45 and 46. A wrench (not shown) is applied to the prismatic surfaces of the assembly, and the turnbuckle is rotated to adjustment of the spacing apart between members 80 and 81. When this is completed, the central barrel is held by one wrench and one of the nuts by another wrench. They are countertorqued relative to one another (holding the barrel against rotation relative to members 80 and 81), which will shear the respective shear section and cause the respective set of faces to move against each other whereby the nut acts as a jam nut. Then this is repeated on the other nut.

FIG. 10 illustrates that a rotation of approximately 30 degrees will ordinarily be quite sufficient for the above purpose. There is sufficient play in the threads to enable this rotation, shearing, and jamming to occur even when the slit is entirely closed. As can be seen in FIG. 9, the wrenching surfaces on the tightened nuts are out of phase with the wrenching surfaces on the barrel. This will indicate to an inspector that the turnbuckle has been adjusted and locked in place, for otherwise they would still be aligned.

When the device of FIG. 11 is used, the result is the same, except that instead of bearing against each other, the faces will bear against the respective washers but the same shear effect will occur. The washers could be made from some softer material to enable the nuts to move axially somewhat more than might be permitted by the closed slit arrangement of FIG. 7, but this is optional.

A comparison of FIGS. 6 and 13 show that in FIG. 6 the shear section is somewhat more elongated and in FIG. 13 is somewhat more localized. Both forms of the invention are useful and have their own advantages.

This invention thereby provides an elegantly simple unitary lockable turnbuckle which can readily be adjusted by hand or power wrenches and locked in place by torque wrenches in a simple, reliable and readily inspectible manner.

This invention is not to be limited by the embodiments shown by the drawings and described in the description which are given by way of example and not of limitation, but only in accordance with the scope of the appended claims.

I CLAIM:

1. A unitary lockable turnbuckle comprising:
   a barrel having a central axis, a first and a second end, a first face on the first end, a second face on the second end, a first axial bore entering the first end through the first end face, and a second axial bore entering the second end through the second end face, said faces extending laterally relative to the central axis and surrounding the end of their respective bores;
   a first nut having a central axis, a first bearing face; and a passage entering the first nut through said first bearing face;
   a second nut having a central axis, a second bearing face, and a passage entering the second nut through said second bearing face;
   a first and a second shear section integral with and interconnecting the barrel with the first and the second nut, respectively;
   a first and a second thread, said first thread being in phase in the passage of the first nut and in the first axial bore, said second thread being in phase in the passage of the second nut and the second axial bore, said first and second threads being of opposite hand from one another, said first faces facing one another, and said axes all being coaxial.

2. A unitary lockable turnbuckle according to claim 1 in which first washer means is disposed between said first faces, and second washer means is disposed between said first faces, said washers passing an object threaded into the respective threads.

3. A unitary lockable turnbuckle according to claim 1 in which said first faces are substantially adjacent to one another, and in which said second faces are substantially adjacent to one another.

4. A unitary lockable turnbuckle according to claim 1 in which said first faces are closely adjacent to one another, and in which said second faces are closely adjacent to one another.

5. A unitary lockable turnbuckle according to claim 1 in which said nuts and barrel are formed from a single integral piece of material, each of the shear sections comprising an unremoved edge of a lateral slot, which slot extends completely across the respective bore and passage.

6. A unitary lockable turnbuckle according to claim 5 in which second washer means is disposed between said first faces, and second washer means is disposed between said first faces, said washers passing an object threaded into the respective threads.

7. A unitary lockable turnbuckle according to claim 5 in which said first faces are adjacent to one another, and in which said second faces are substantially adjacent to one another.

8. A unitary lockable turnbuckle according to claim 5 in which said first faces are closely adjacent to one another, and in which said second faces are closely adjacent to one another, and in which the shear sections are comprised of material displaced outwardly by axial compression of the nuts against the barrel.

9. A unitary lockable turnbuckle according to claim 1 in which wrenching surfaces are carried by the nuts and by the barrel.

10. A unitary lockable turnbuckle according to claim 9 in which said wrenching surfaces extend axially, and in which the wrenching surfaces on the nuts are angularly aligned with the wrenching surfaces on the barrel.

11. A unitary lockable turnbuckle according to claim 10 in which the outside walls of the nuts and barrel are prisms, the wrenching surfaces being comprised by sides of the prisms.

12. A unitary lockable turnbuckle according to claim 10 in which the nuts and the barrel ae externally hexagonal.

13. A unitary lockable turnbuckle according to claim 5 in which wrenching surfaces are carried by the nuts and by the barrel.

14. A unitary lockable turnbuckle according to claim 13 in which said wrenching surfaces extend axially, and in which the wrenching surfaces on the nuts are angularly aligned with the wrenching surfaces on the barrel.

15. A unitary lockable turnbuckle according to claim 14 in which the outside walls of the nuts and barrel are prisms, the wrenching surfaces being comprised by sides of the prisms.

16. A unitary lockable turnbuckle according to claim 14 in which the nuts and the barrel are externally hexagonal.

17. A unitary lockable turnbuckle according to claim 8 in which wrenching surfaces are carried by the nuts and by the barrel.

18. A unitary lockable turnbuckle according to claim 17 in which said wrenching surfaces extend axially, and in which the wrenching surfaces on the nuts are angularly aligned with the wrenching surfaces on the barrel.

19. A unitary lockable turnbuckle according to claim 18 in which the outside walls of the nuts and barrel ae prisms, the wrenching surfaces being comprised by sides of the prisms.

20. A unitary lockable turnbuckle according to claim 18 in which the nuts and the barrel are externally hexagonal.

21. A method for making a unitary lockable turnbuckle comprising: in a rod-like member having an axis, and a first and a second end, forming a bore at each end, forming two slits across the bore so as to leave a shear section at each slot, and forming a first thread of one hand at one end and a second thread of another hand in phase across the slits.

22. A method according to claim 22 in which the slits divde the member into a barrel and two nuts, one nut being on each end of the barrel, and in which, prior to forming the threads, the nuts are pressed against the barrel substantially to eliminate the slits, and the threads are thereafter formed.

23. A method according to claim 21 in which a washer is placed in each slit.

* * * * *